(12) United States Patent
Toyota et al.

(10) Patent No.: US 7,152,159 B2
(45) Date of Patent: Dec. 19, 2006

(54) ENCRYPTED MAIL TRANSMISSION SYSTEM

(75) Inventors: Kiyoshi Toyota, Tokyo (JP);
Matsutoshi Murata, Tokyo (JP);
Masao Akimoto, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 834 days.

(21) Appl. No.: 09/949,759

(22) Filed: Sep. 12, 2001

(65) Prior Publication Data

US 2002/0124167 A1 Sep. 5, 2002

(30) Foreign Application Priority Data

Mar. 1, 2001 (JP) ............................. 2001-056607

(51) Int. Cl.
*H04L 9/00* (2006.01)

(52) U.S. Cl. ...................................... 713/161; 713/176

(58) Field of Classification Search ................ 713/161, 713/176; 709/206, 207; 705/67, 75, 76
See application file for complete search history.

(56) References Cited

U.S. PATENT DOCUMENTS

| 5,881,233 | A | | 3/1999 | Toyoda et al. |
| 6,038,551 | A | * | 3/2000 | Barlow et al. ................ 705/41 |
| 6,321,267 | B1 | * | 11/2001 | Donaldson .................. 709/229 |
| 6,584,564 | B1 | * | 6/2003 | Olkin et al. ................ 713/152 |

FOREIGN PATENT DOCUMENTS

JP 8-242326 9/1996

OTHER PUBLICATIONS

"America Online for Windows: tour guide" 1994, Tom Litchy, 2nd edition, pp. 29, 75, 83,84, 87.*
"How Computers Work", Ron White, 1999, Millenium Edition, pp. 352, 353.*
"How the Internet Works", pp. 18-19, 78-87, Preston Gralla, 4th edition, 1998.*
"Microsoft Outlook at a Glance", Stephen Nelson, 1997, p. 45-47, 50-51, 24.*
English Language Abstract of JP 8-242326.
English Language Abstract of JP 8-242326.

* cited by examiner

*Primary Examiner*—Kambiz Zand
*Assistant Examiner*—Thomas Ho
(74) *Attorney, Agent, or Firm*—Greenblum & Bernstein, P.L.C.

(57) ABSTRACT

In the present invention, the an electronic mail transmission terminal device encrypts an electronic mail and transmits the encrypted mail. An electronic mail server device, when the encrypted mail is received, transmits a reception notification mail, which notifies reception of the encrypted mail, to an electronic mail reception terminal device in which a receiver of the encrypted mail is stored. An electronic reception terminal device, when the reception notification mail is received from the electronic mail server device, indicates reception of the encrypted mail to the receiver, requests electronic mail server device to transmit the encrypted mail after performing personal authentication of the receiver. Further, the electronic reception terminal device decrypts the encrypted mail.

13 Claims, 10 Drawing Sheets

ENCRYPTED MAIL TRANSMISSION SYSTEM

BACKGROUND OF THE INVENTION

1. Field of the Invention

This invention relates to an encrypted mail transmission system.

2. Description of Related Art

Recently, a facsimile apparatus that transmits image data through the Internet according to an operation similar to that of a common facsimile. This type of facsimile is called an Internet facsimile terminal apparatus (hereinafter, "IFAX terminal"), since the Internet is used as a whole or a part of the transmission path.

This type of IFAX terminal converts facsimile data into an electronic mail format to transmit. More specifically, the IFAX terminal converts a read original into MH data, and further converts the MH data into a TIFF file. Further, the TIFF file is converted into a text code, and the data converted into the text code is further converted into data in compliance with the MIME format. Then, the data in compliance with the MIME format is transmitted.

The IFAX terminal is not generally occupied by one person, rather, is shared by plural people in a single department at an office. Further, an electronic mail addressed to the IFAX terminal is automatically received by the IFAX terminal, and is printed out. Thus, the electronic mail might be seen by the people other than the individual specified by the sender. Accordingly, it is considered that the confidentiality of the IFAX terminal is lower than that of a mail reception terminal occupied by a single person, such as a common personal computer.

To improve confidentiality, the IFAX terminal conventionally uses a technology of an electronic signature or data encryption to prevent an interception, rewriting and impersonation of an electronic mail. This type of IFAX terminal is called a "secure IFAX". A conventional secure IFAX has an IC card reader, reads information (for example, public key, confidential key, and so on) necessary for electronic signature or data encryption from an IC card at a transmission (sender) side, applies an electronic signature process or a data encryption process to an electronic mail by using the information read from the IC card, and then transmits the processed (encrypted) electronic mail. At a receiver side, when an individual designated in the electronic mail inserts his/her own IC card into a slot, the electronic mail is decrypted by using the public key, confidential key, and so on, read from the IC card, and is printed thereafter. Thus, the electronic mail is prevented from being intercepted by a person other than the owner of the IC card.

However, to allow only the owner of the IC card to receive an electronic mail, the conventional secure IFAX logs on a POP server by using a mail account and a password of the owner stored in the IC card, and receives the electronic mail at the secure IFAX of the owner. In this case, the insertion of the IC card into the slot is an indispensable condition of the mail reception. Thus, if periodical accesses to the POP server to receive the latest electronic mail are required, the IC card must be always inserted in the slot. This degrades confidentiality. Thus, it is difficult to maintain the confidentiality of a confidential document, and simultaneously to receive the confidential document as early as possible in real time. Further, when the mail account and the password are stored in the secure IFAX itself to enable a connection to the POP server without the IC card, high level confidentiality cannot be achieved similarly. Accordingly, the conventional secure IFAX cannot achieve two contradictory requirements, i.e., high level confidentiality and immediate (urgent) distribution of a confidential document.

SUMMARY OF THE INVENTION

The present invention is designed with respect to the above-described problems. The object of the present invention is to provide an encrypted mail transmission system that achieves the above-described contradictory requirements, i.e., high level confidentiality and immediate (urgent) distribution of a confidential document.

In the present invention, the an electronic mail transmission terminal device encrypts an electronic mail and transmits the encrypted mail. An electronic mail server device, when the encrypted mail is received, transmits a reception notification mail, which notifies reception of the encrypted mail, to an electronic mail reception terminal device in which a receiver of the encrypted mail is stored. An electronic reception terminal device, when the reception notification mail is received from the electronic mail server device, indicates reception of the encrypted mail to the receiver, requests electronic mail server device to transmit the encrypted mail after performing personal authentication of the receiver. Further, the electronic reception terminal device decrypts the encrypted mail.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
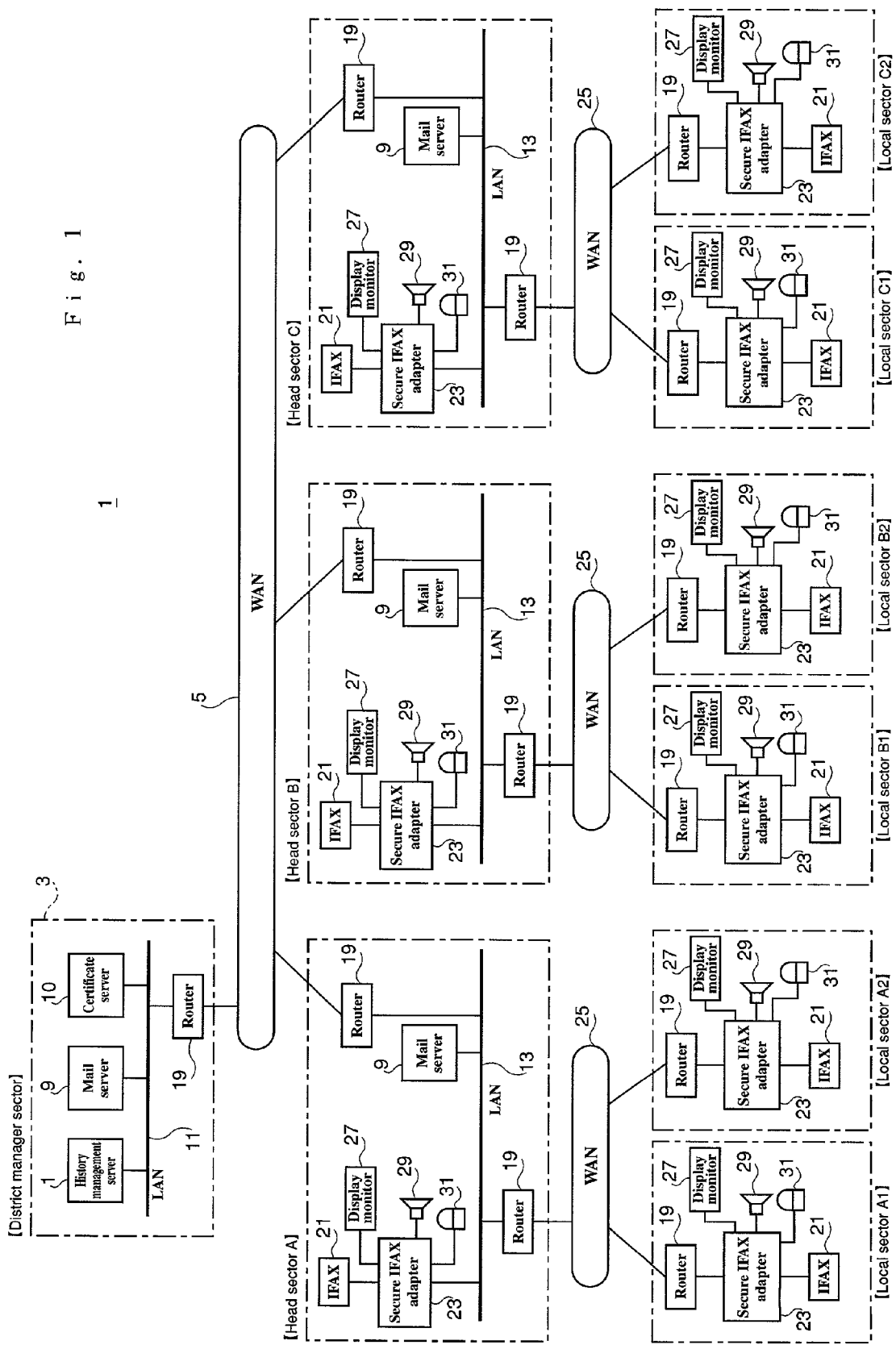
FIG. 1 is a schematic view illustrating an electronic mail transmission system according to an embodiment of the present invention.

The embodiment of the present invention is explained in the following with reference to figures. FIG. 1 is a schematic view illustrating an electronic mail transmission system according to an embodiment of the present invention.

The electronic mail transmission system 1 includes a single district managing sector 3, plural head sector A–C managed by the district managing sector 3, and plural local sectors A1 and A2, B1 and B2, and C1 and C2 managed by the head sectors A, B and C, respectively. These sectors are connected by WANs 5. and 25.

The district managing sector 3 is provided with a LAN 11 including a history management server 7, a mail server 9 and a certificate server 10. Further, the head sectors A, B and C are provided with LANs 13, 15 and 17, respectively, each including a mail server 9. The LANs 11–17 are connected to the WAN 5 through routers 19.

Each of the head sectors A–C and the local sectors A1–C2 has an IFAX terminal 21 that is connected to a secure IFAX adapter 23. The secure IFAX adapter 23 provided in each of the local sectors A1–C2 is connected to the WAN 25 through a router 19. The secure IFAX adapter 23 is provided with (connected to) a display monitor 27, a speaker 29 and an indicator lamp 31.

Figure 2:
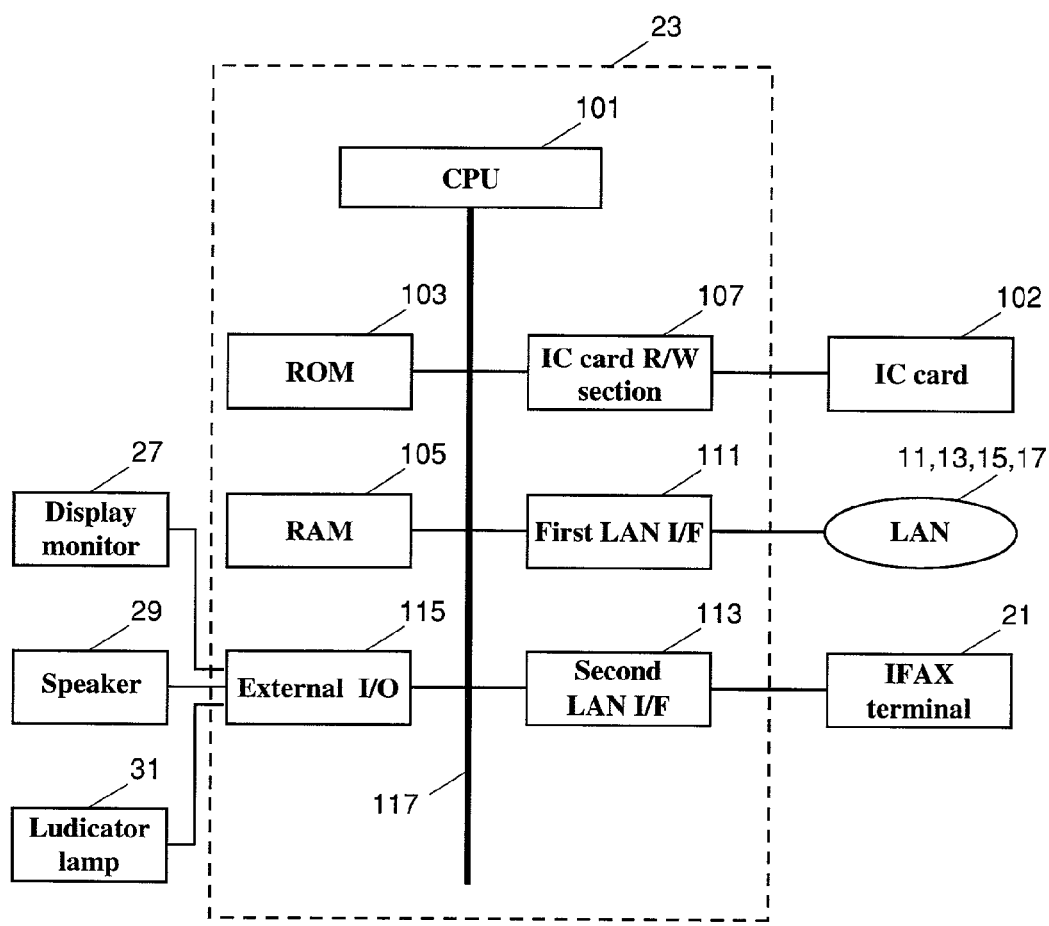
FIG. 2 is a block diagram illustrating a hardware configuration of a secure IFAX adapter according to the embodiment of the present invention.

FIG. 2 is a block diagram illustrating a hardware configuration of the secure IFAX adapter according to the embodiment of the present invention. In the sure IFAX adapter 23, a central processing unit (CPU) 101 performs a variety of programs to control each component of the secure IFAX adapter 23. ROM 103 stores programs performed by the CPU 101. RAM 105 is used as a data area of the program and as a memory that stores predetermined data.

An IC card READ/WRITE section (hereinafter, "IC card R/W section") 107 write predetermined data into an IC card 109 inserted into an IC card slot (not shown), and reads data written in the IC card 109.

A first LAN interface (hereinafter, "first LAN I/F") 111 is an interface that controls transmission/reception of data to/from the LAN 11–17. Instead of the LANs 11–17, the first LAN I/F 111 can be directly connected to the routers 19. A second LAN interface (hereinafter, "second LAN I/F") 113 is an interface that controls transmission/reception of data to/from the IFAX terminal 21.

An external input/output interface (hereinafter, "external I/O") 115 is an interface to connect to the display monitor 27, the speaker 29 and the indicator lamp 31.

A bus 117 is a path in which data is transmitted among the CPU 101, the ROM 103, the RAM 105, the IC card R/W section 107, the first LAN I/F 111, the second LAN I/F 113 and the external I/O 115.

Figure 3:
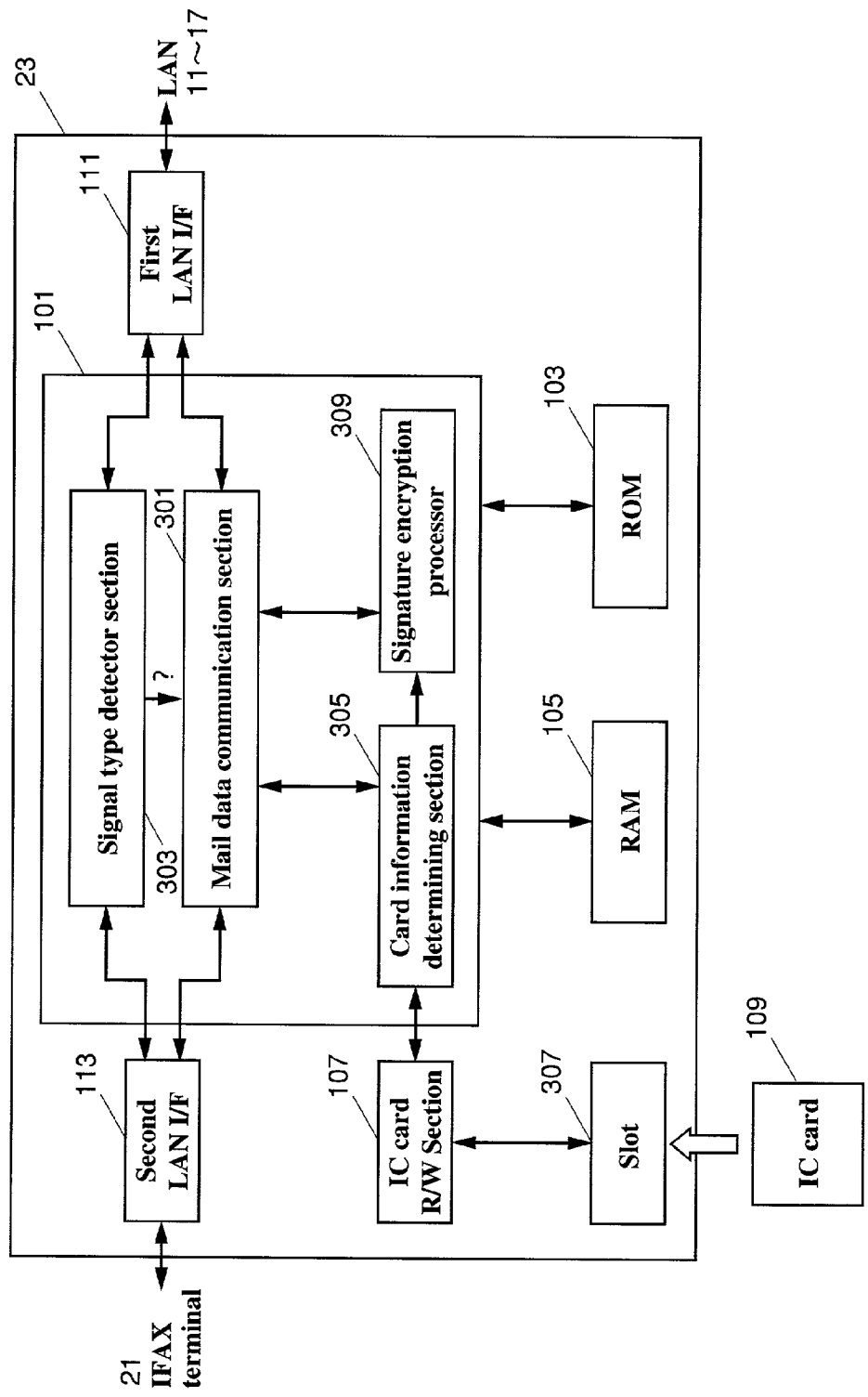
FIG. 3 is a block diagram illustrating primary functions of the secure IFAX adapter according to the embodiment of the present invention.

FIG. 3 is a block diagram illustrating a primary function of the secure IFAX adaptor according to the embodiment of the present invention. A signal type detector 303 detects a predetermined command signal (response signal) output from the second LAN I/F 113 in the process transmitting electronic mail data from the IFAX terminal 21, or a predetermined command signal (response signal) output from the first LAN I/F 111 in the process receiving electronic mail data from the LAN 11–17. When the predetermined command signal is detected, the signal type detector 303 recognizes that electronic mail data will be output subsequently from the second LAN I/F 113 and the first LAN I/F 111, and informs the mail data communication section 301 of the result of the recognition.

In the process transmitting electronic mail data from the IFAX terminal 21, the predetermined command signal (response signal) is a response signal "354" output from the mail server 9. On the other hand, in the process receiving electronic mail data from the LANs 11–17, the predetermined command signal is an ok response signal output from the mail server 9 after a signal "RETR" was output to the mail server 9.

When the signal type detector 303 informs the mail data communication section 301 of the output of the electronic mail data, the mail data communication section 301 receives electronic mail data from the first LAN I/F 111 and the second LAN I/F 113. Further, the mail data communication section 301 performs a transmission/reception process of electronic mail data according to electronic mail address information received from a card information determining section 305, which is explained later.

The card information determining section 305 checks contents of information read from the IC card 109 inserted into the IC card slot 307 by the IC card R/W section 107. Then, when the IC card 109 stores information necessary for a signature process or a signature encryption process, the card information determining section 305 gives the information to the signature encryption processor 309.

Further, the card information determining section 305 determines whether the IC card 109 is inserted into the IC card slot 307 according to the information read by the IC card R/W section 107. Moreover, the card information determining section 305 checks electronic mail address information stored in the IC card 109, and informs the mail data communication section 301 of the (checked) electronic mail address information.

The signature encryption processor 309 performs a process, such as a signature encryption process, and so on, on the electronic mail data received by the mail data communication section 301 according to the information necessary for the signature encryption process, and so on, received from the card information determining section 305. Further, the signature encryption processor 309 decrypts the electronic mail data, to which the signature encryption process, and so on, is applied, received from the mail data communication section 301 according to the information necessary for the signature encryption process, and so on, received from the card information determining section 305.

Here, the information stored in the IC card 109 is explained. The IC card 109 is owned by each user who transmits an electronic mail from the IFAX terminal 21, and stores electronic mail address information (destination (addressee) account) of each owner (user). In other words, only when the IC card 109 is inserted into the secure IFAX adapter 23, each owner can transmit an electronic mail from his/her own electronic mail address, and can receive an electronic mail directed to his/her own electronic mail address.

Further, the IC card 109 stores information necessary for the signature process or the signature encryption process. In other words, the IC card 109 stores its own confidential key information and public key information. The public key information of the destination (addressee) is retrieved from the certificate server 10, and then is stored into the RAM 105 of the secure IFAX adapter 23.

Figure 4:
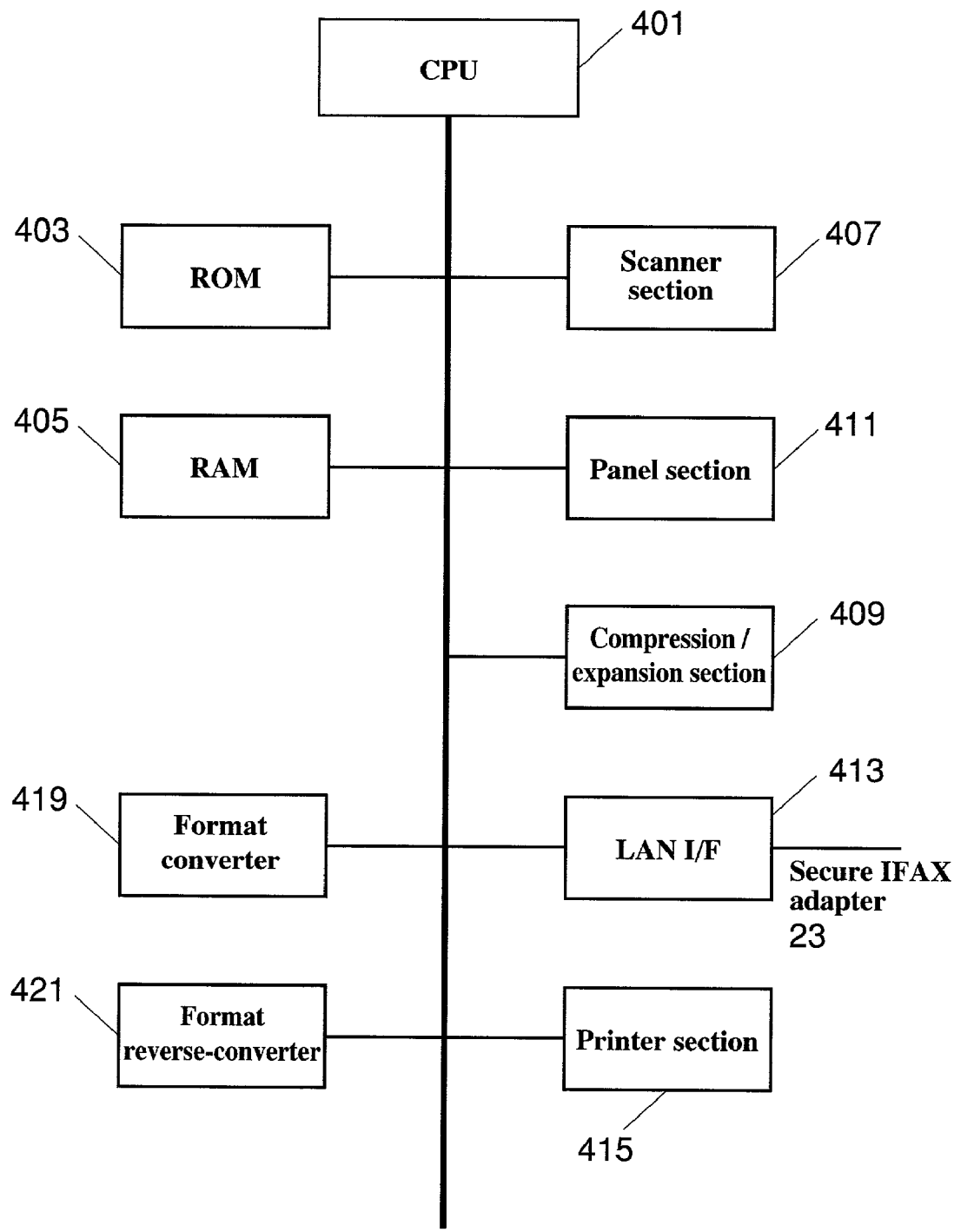
FIG. 4 is a block diagram illustrating a configuration of an IFAX terminal connected to the secure IFAX adapter according to the embodiment of the present invention.

On the other hand, the IFAX terminal 21 is, for example, an apparatus disclosed in Japanese laid-open publication 8-242326, which converts an image scanned by a scanner into an electronic mail, transmits the (converted) electronic mail through a LAN, and receives an electronic mail converted from an image at a transmission (sender) side, and reverse converts the (received) electronic mail into an original image to print. An example of the IFAX terminal 21 is briefly explained with reference to FIG. 4. FIG. 4 is a block diagram illustrating a configuration of the IFAX terminal 21 connected to the secure IFAX adapter according to the embodiment of the present invention.

In addition to CPU 401, ROM 403 and RAM 405, the IFAX terminal 21 further includes a scanner section 407, a compression/expansion section 409, a LAN I/F 413, a printer section 415, a panel section 411, a format converter 419 and a format reverse converter 421. The scanner section 407 scans an original to obtain an image. The compression/expansion section 409 compresses the image into a compressed image data in a compression format, such as MH, and expands the compressed image data into an original image. The LAN I/F 413 is connected to the secure IFAX adapter 23, and so on. The printer section 415 prints an image. The panel section 411 is provided to input a destination (addressee). The format converter 419 converts the compressed image data into an electronic mail. The format reverse converter 421 reverse converts the electronic mail into compressed image data.

In IFAX terminal 21, when a sender (user) sets an original on an original plate of the scanner section 407, input a destination mail address through the panel section 411 and presses a start button, the original is scanned to obtain image data, and the compression/expansion section 409 compresses the (scanned) image data into compressed image data. The format converter 419 converts the compressed image data into an electronic mail, which is coded as an attachment file of an electronic mail according to MIME. The electronic mail is transmitted to the IFAX adapter 23 through the LAN I/F 413.

On the other hand, when the IFAX terminal 21 receives an electronic mail through the LAN I/F 413, compressed image data attached to the electronic mail is decoded, the compression/expansion section 409 expands to (decoded) data to obtain original image data, and the printer section 415 prints the obtained original image data.

In this embodiment, as described above, the transmission (sender) side IFAX terminal 21A and secure IFAX adapter 23A form an electronic mail transmission terminal apparatus, and a reception (receiver) side IFAX terminal 21B and secure IFAX adapter 23B form an electronic mail reception terminal apparatus.

Figure 5:
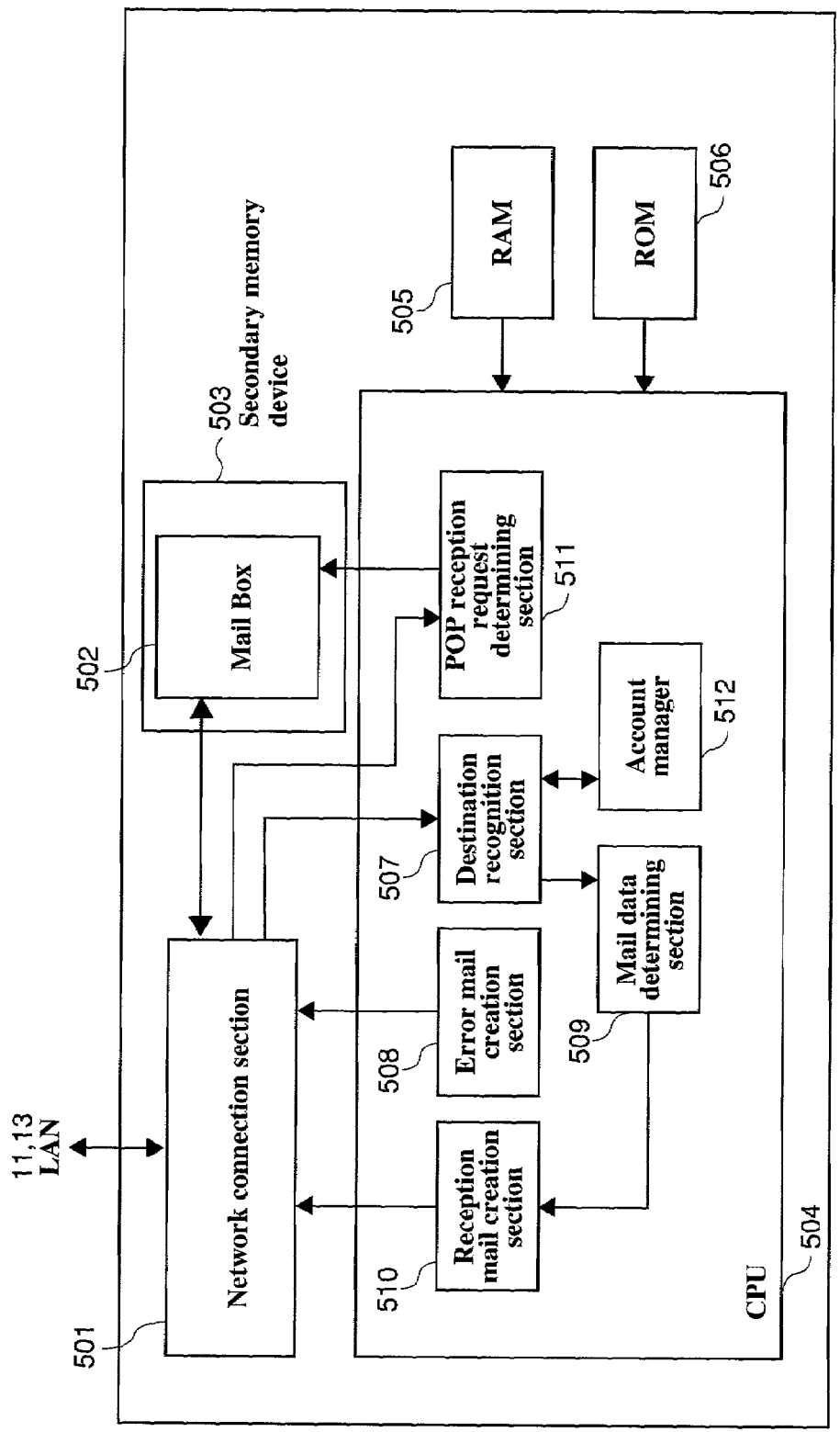
FIG. 5 is a block diagram illustrating a hardware configuration of a mail server according to the embodiment of the present invention.

FIG. 5 is a block diagram illustrating hardware configuration of a mail server according to the embodiment of the present invention. In the mail server 9, the network connection section 501 is connected to the LAN 11 and 13. A mailbox 502 is provided in a secondary memory device 503, such as a hard disk, and stores received e-mail data for each destination (addressee).

Figure 9:
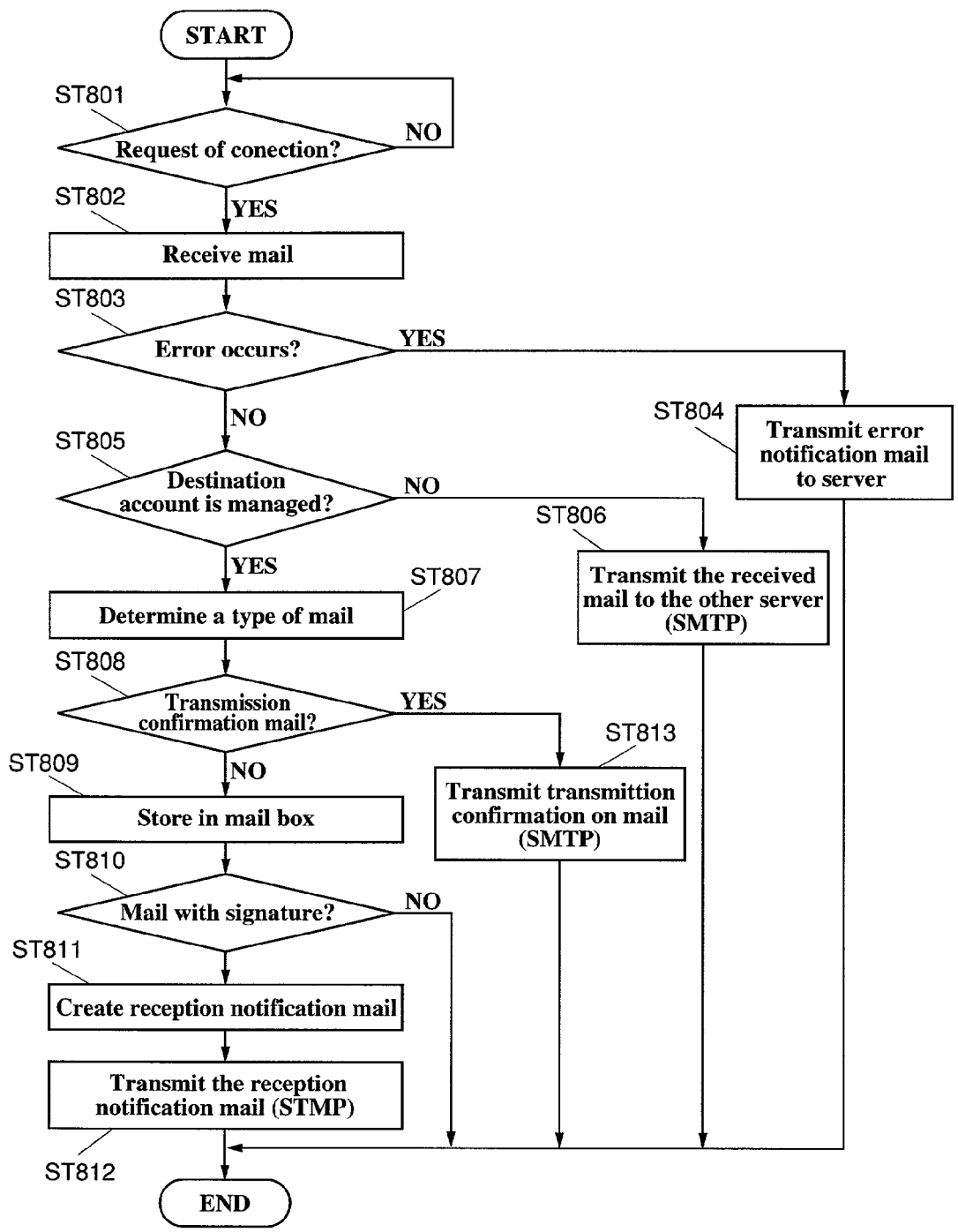
FIG. 9 is a flowchart illustrating a mail transmission operation of the mail server in the electronic mail transmission system according to the embodiment of the present invention.

A CPU 504 operates computers, and so on, and performs a process shown in FIG. 9 on the received electronic mail, using RAM 505 and ROM 506.

A destination recognition section 507 recognizes a destination address of the received electronic mail data. When the destination address cannot be recognized, the destination recognition section 507 instructs an error mail creation section 508 for creating an error mail.

A mail data determining section 509 detects a type of electronic mail data by determining whether the electronic mail data is a mail with a signature. When the electronic mail data is the mail with signature, the mail data determining section 509 instructs a reception mail creation section 510 for creating a reception mail.

A POP reception request determining section 511 determines whether a POP reception request is received from a terminal. When a request is received, the POP reception request determining section 511 sends corresponding mail data according to an account of the requester, to the electronic mailbox 502. An account manager 512 manages accounts of electronic mail reception terminal devices managed by the mail server 9 itself.

In the following, an example is explained in which, the electronic mail transmission system of the above-described embodiment, an electronic mail is transmitted between the head sector A and the IFAX terminals 21 and the secure IFAX adaptor 23 provided in the local sector Al.

Figure 6:
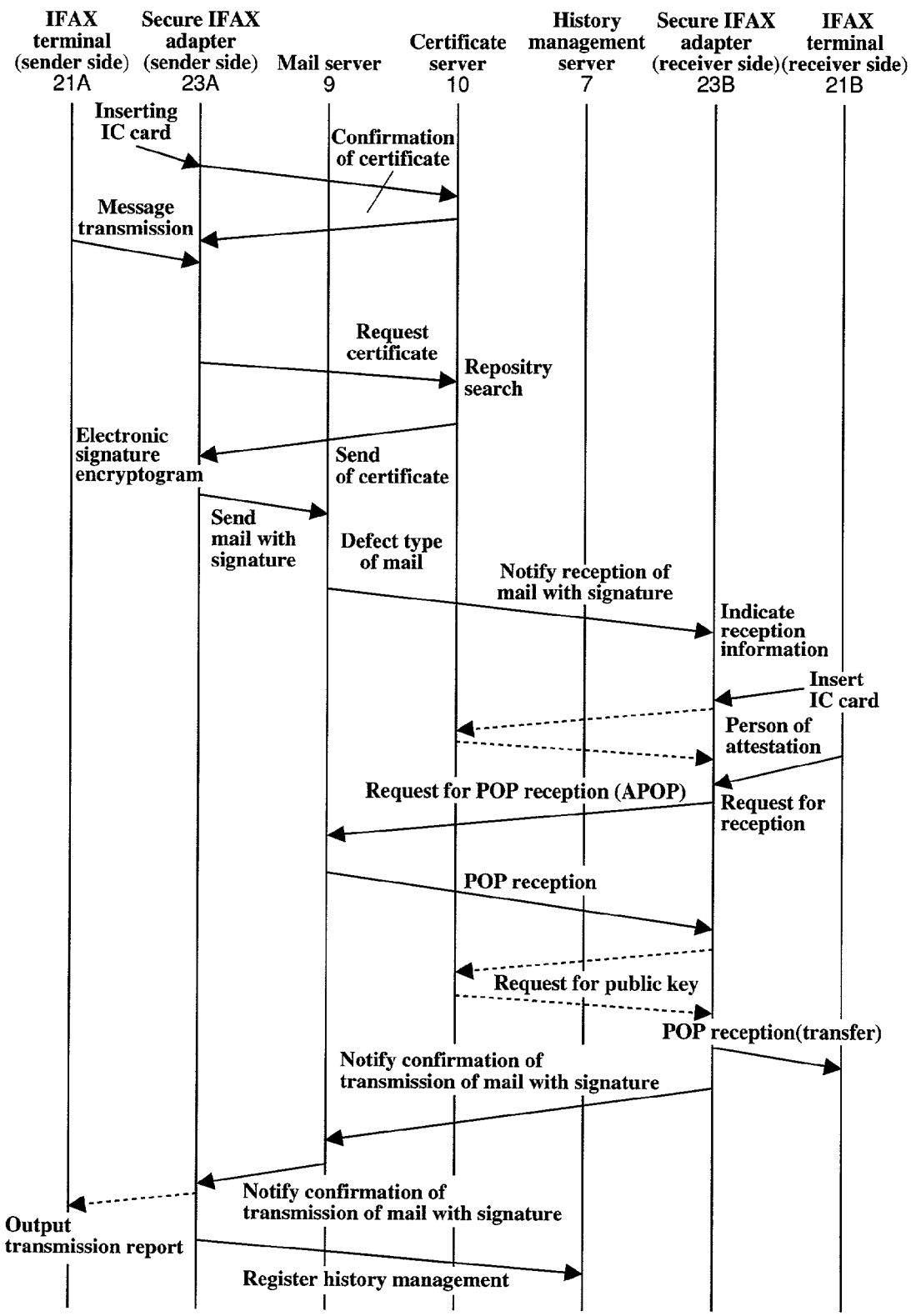
FIG. 6 is a sequential chart illustrating a mail transmission sequence of the electronic mail transmission system according to the embodiment of the present invention.
Figure 7:
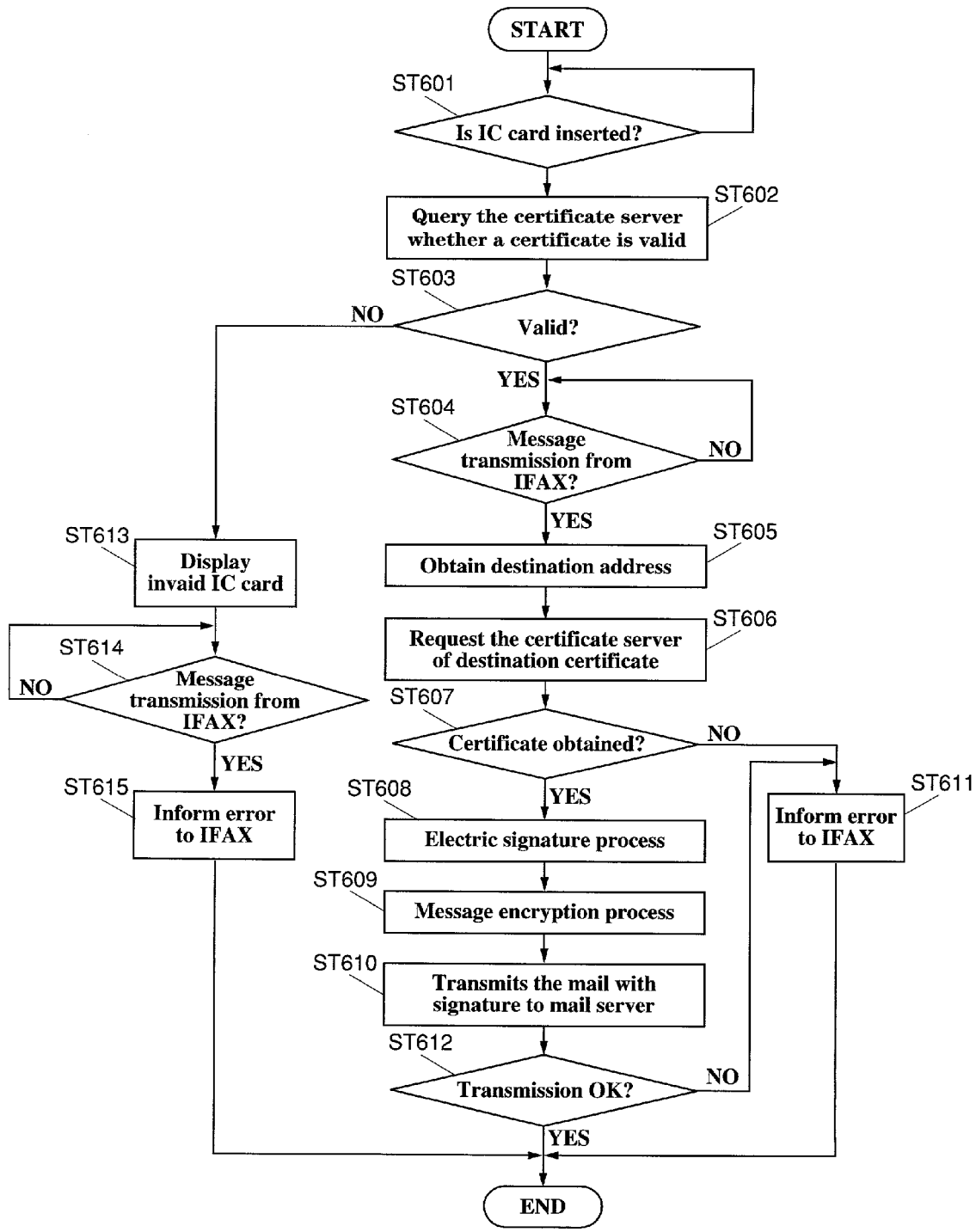
FIG. 7 is a flowchart illustrating an operation of the secure IFAX adapter at a transmission (sender) side in the electronic mail transmission system according to the embodiment of the present invention.
Figure 8:
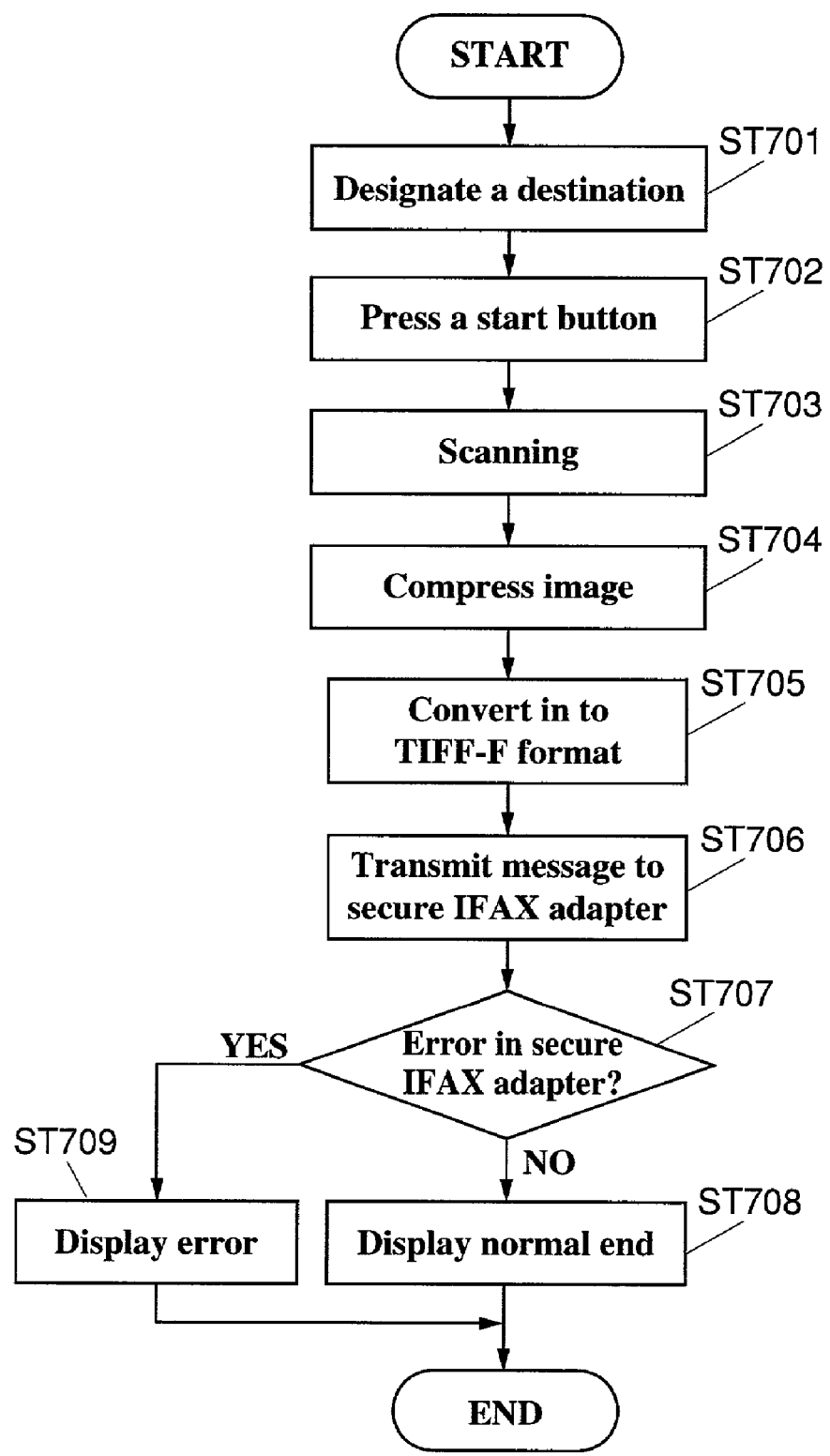
FIG. 8 is a flowchart illustrating a mail transmission operation of the IFAX terminal at the transmission (sender) side in the electronic mail transmission system according to the embodiment of the present invention.
Figure 10:
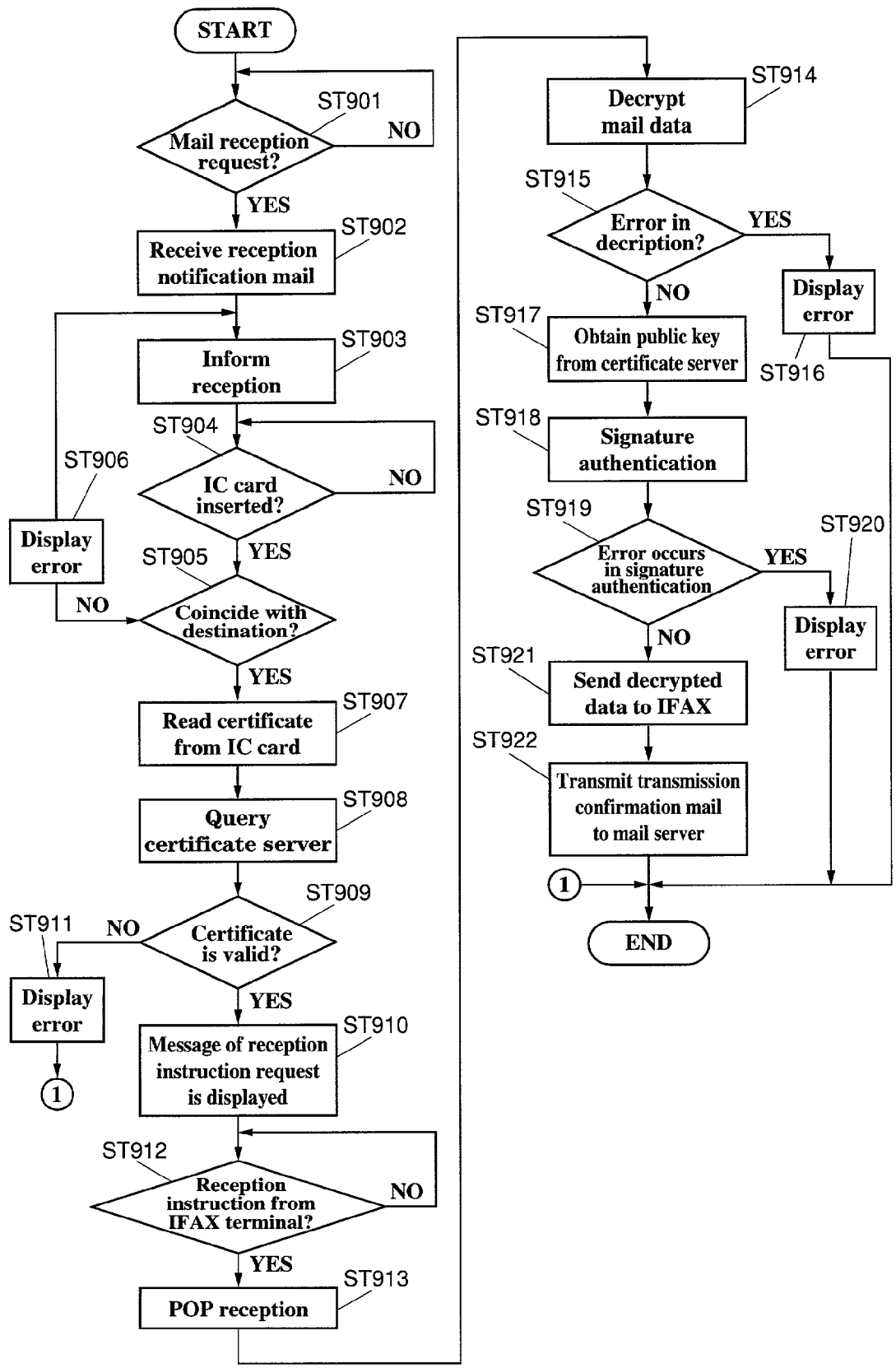
FIG. 10 is a flowchart illustrating an operation of the secure IFAX adapter at the reception (receiver) side in the electronic mail transmission system according to the embodiment of the present invention.

FIG. 6 is a sequential chart illustrating a mail transmission sequence in the electronic mail transmission system of the above-described embodiment. FIG. 7 is a flowchart illustrating an operation of the sender side secure IFAX adapter in the electronic mail transmission system of the above-described embodiment. FIG. 8 is a flowchart illustrating a mail transmission operation in the sender side IFAX terminal in the electronic mail transmission system according to the above-described embodiment. FIG. 9 is a flowchart illustrating a mail transmission operation of the mail server in the electronic mail transmission system according to the above-described embodiment. FIG. 10 is a flowchart illustrating an operation of the reception (receiver) side secure IFAX adapter in the electronic mail transmission system according to the above-described embodiment.

As shown in FIG. 6, electronic mail transmission of the present embodiment starts when a sender (user) inserts an IC card 109 into the IC card slot 307 of the sender side secure IFAX adapter 23A. As shown in FIG. 7, when the IC card 109 is inserted (ST601), a query is sent to the certificate server 10 to confirm whether the certificate stored in the IC card 109 is valid (ST602). Then, it is determined whether a response (result) of the query is valid (ST603), and when it is determined that the response (result) is valid, the secure IFAX adapter 23A waits for transmission of a message sent from the sender side IFAX terminal 21A (ST604).

There is a case in which the IFAX terminal 21A sends a message before the secure IFAX server 23A completes the confirmation process of the certificate. In this case, the transmitted (received) message is once stored in the secure IFAX adapter 23A, and the stored message is automatically transmitted after the certificate is confirmed. According to this construction, communication for the confirmation of the certificate is not required between the IFAX terminal 21A and the secure IFAX adapter 23A. Thus, it is possible to use an existing IFAX terminal. On the other hand, it is possible to construct the IFAX terminal 21A so that, when the IFAX terminal 21A receives a notification indicating completion of the confirmation process from the secure IFAX adapter 23A, a waiting message in the IFAX terminal 21A is then transmitted. In this construction, since the secure IFAX adapter 23A is not required to store the data, an extra memory is not required. In addition, since the transmission is performed after the confirmation of the certificate is completed, the process is performed more securely.

In the sender side IFAX terminal 21A, as shown in FIG. 8, after a destination is designated through the panel section 411 (ST701), when the start button (not shown) provided on the panel section 411 is pressed (ST702), the scanner section 407 scans an original (ST703), the compression/expansion section 409 compresses the obtained image data (ST704), the format converter 419 converts the compressed image data into a TIFF format (ST705), and a message is created. This message includes a destination address. Thereafter, the message is transmitted through the LAN I/F 413 to the secure IFAX adapter 23A (ST706).

The explanation is returned to FIG. 7. In ST604, when the secure IFAX adapter 23A receives a message from the IFAX terminal 21A, a destination address is obtained from the message (ST605). By using this destination address, a request of a destination certificate is sent to the certificate server 10 (ST606). The certificate server 10 performs a repository search and issues a destination certificate. The repository search means a check of (retrieved) destination certificate stored in the certificate server 10 using the destination address. The secure IFAX adapter 23A determines whether the certificate is obtained (ST607). When the certificate is obtained, the secure IFAX adapter 23A applies an electronic signature process (ST608) and an encryption process (ST609) to the message received from the IFAX terminal 21A, to create an electronic mail to which signature encryption process is applied (hereinafter, referred as to "mail with signature").

More specifically, the signature encryption processor 309 shown in FIG. 3 obtains a destination certificate (public key information) from the certificate server 10. On the other hand, the card information determining section 305 gives the signature encryption processor 309 its own confidential key information stored in the IC card 109. The signature encryption processor 309 performs the signature encryption process using this self certificate (confidential key information) and the destination certificate (public key information).

Further in detail, first, the message is processed by an operation using irreversible function, such as a hush function, and so on, to extract a message digest. The (extracted) message digest is encrypted by using its own confidential key information. Further, an encryption key called DEK (data encryption key) (using a pseudo random number) is generated. Then, the DEK is encrypted by using the public key information of the destination. On the other hand, the message digest (signature result), that is previously encrypted, and the message of an electronic mail are encrypted according to a predetermined encryption method (for example, DES: data encryption standard) by using the DEK.

When, in ST607, the destination certificate cannot be obtained, an error is informed to the IFAX terminal 21A (ST611), and the process terminates. However, alternatively, it is possible that the card information determining section 305 gives the signature encryption processor 309 self confidential key information stored in the IC card 109, and that signature encryption processor 309 performs the signature process by using the self confidential key information.

The mail with signature created as described above is transmitted to the mail server 9 (ST610). Then, it is determined whether the transmission is completed normally (ST612). If the transmission is not completed normally, an error is informed to the IFAX terminal 21A (ST611).

On the other hand, in ST603, when the certificate is invalid, a message indicating that the IC card is invalid is displayed on the display monitor 27 (ST613). When a message has been transmitted from the IFAX terminal 21A (ST614), an error is informed to the IFAX terminal 21A (ST615).

The process shown in FIG. 8 is explained again. After the sender side IFAX terminal 21A transmits the message in ST706, the sender side IFAX terminal 21A monitors whether there is an unexamined error in the secure IFAX adapter 23A (ST707). If there is no error, the sender side IFAX terminal 21A displays a message indicating a normal termination completion of the transmission on an LCD (not shown) of the panel section 411 (ST708). If there is an error, error information is displayed (ST709).

The mail server 9 receives a variety of electronic mails including the mail with signature from the sender side secure IFAX adapter 23A. As shown in FIG. 9, after the mail server 9 receives a request of connection (ST801), the mail server 9 receives an electronic mail (ST802). The reception of the electronic mail is performed in accordance with SMTP protocol, for example. It is determined whether an error occurs during the reception of the electronic mail (ST803). If an error occurs, an error notification mail is transmitted to the sender (ST804), and the process terminates. On the other hand, if no error occurs, it is determined whether the destination account of the electronic mail is managed by itself (ST805). When the destination account is not managed by itself, the received electronic mail is transferred to the other server (ST806), and the process terminates.

When the destination account is managed by itself, a type of electronic mail is determined (ST807). The determination is, in detail, performed as follows. When the mail header is analyzed, and the analyzed mail header is a header indicating confirmation of the transmission, i.e., "contexts-type: multipart/report:" the electronic mail is recognized as a transmission confirmation mail.

After the type of electronic mail is recognized, it is determined whether the electronic mail is a transmission confirmation mail based on the result of the recognition (ST808). The transmission confirmation mail is explained later.

When the electronic mail is not the transmission confirmation mail, the electronic mail is stored in the mail adapter corresponding to the destination account (ST809). Next, it is determined whether the electronic mail is a mail with signature (ST810). When the electronic mail is a mail with signature, a reception notification mail, which notifies the reception side secure IFAX adapter 23B of the reception of the electronic mail is created (ST811). The reception notification mail is transmitted to the destination same as the destination account (destination mail address) of the mail with signature. Accordingly, the destination field, following to "To:", includes the destination account (for example, "Shibutyou@Shibu.cojp"). The mail server 9 recognizes an IP address of the reception side IFAX adapter 23B by DNS, and transmits the reception notification mail to the recognized IP address by using SMTP protocol (ST812).

The determination of whether the electronic mail is the mail with signature is performed by detecting a string "sign" in the area of "content-type" described in the mail header.

The reception side secure IFAX adapter 23B is always waiting for a mail reception request transmitted from the mail server 9 (ST901). When the request is transmitted, the reception side secure IFAX adapter 23B receives a reception notification mail according to the MTP protocol (ST902). Thereafter, the reception side secure IFAX adapter 23B analyzes the reception notification mail and notifies an individual having a destination address (hereinafter, simply called "receiver") in the reception notification mail of the arrival (reception of) the reception notification mail (ST903). The notification method is not limited to a specific method; however, more specifically, a message informing the arrival (reception) or the name of the receiver can be displayed on the display monitor 27. Alternatively, the name of the receiver or the message can announced by sound through the speaker 29, or the indicator lamp 31 can be lighted. In response to the notification, the receiver inserts the IC card 109 into the card slot 307 of the secure IFAX adapter 23B.

When the reception side secure IFAX adapter 23B confirms the insertion of the IC card 109 (ST904), the reception side secure IFAX adapter 23B determines whether owner information of the IC card 109 coincides with the destination in the reception notification mail (ST905). When the owner information does not coincide with the destination, an error is displayed (ST906), and the process from ST903 to ST905 are repeated until the owner information coincides with the destination. When the owner information coincides with the destination, a certificate is read from the IC card 109 (ST907), and the certificate server 10 is queried to confirm whether the certificate is valid (ST908). It is determined whether the certificate is valid according to the response result from the certificate server 10 (ST909). If the certificate is valid, a message indicating a reception instruction request is displayed on the display monitor 27 (ST910). If the certificate is invalid, an error is displayed (ST911), and the process terminates.

When the receiver turns ON the reception instruction button on a reception side IFAX terminal 21B, a reception instruction signal is transmitted to the secure IFAX adapter 23B. When the reception instruction is received from the IFAX terminal 21B (ST912), the secure IFAX adapter 23B performs a POP reception process with the mail server to receive a mail with signature from the mail server 9 (ST913). The POP reception process uses a log-in ID and a password of the receiver, stored in the IC card 109.

The secure IFAX adapter 23B decrypts the data of the received mail with signature (ST914). The decryption is performed by the signature encryption processor 309 shown in FIG. 3. More specifically, the encrypted DEK is decrypted by using self-confidential key information, and the encrypted data is decrypted by using the decrypted DEK. Then, the electronic mail data of the decrypted data is divided into a message digest and message data.

Next, it is determined whether an error occurs in the decryption process (ST915). If an error occurs, the error is displayed (ST916), and the process terminates. When the decryption is normally performed without an error, a sender certificate (public key information) is obtained from the certificate server 10 (ST917). Then, signature authentication is performed using the obtained public key information (ST918). The signature authentication process is also performed by the signature encryption processor 309. More specifically, the message digest obtained by the decryption process is further decrypted by using the sender's public key information, and the result of the decryption is stored. Further, a message digest is extracted from the message data divided (separated) in the decryption process, by using the Hush function as described above. Then, the extracted message digest is compared with the previously obtained (stored) message digest. Thus, it is possible to confirm whether the message data of the electronic mail has been rewritten, or whether the electronic mail is transmitted from an authorized sender.

It is determined whether an error occurs (in other words, whether the message is transmitted from an authorized sender without being rewritten) according to the signature authentication described above (ST919). If an error occurs, the error is displayed on the display monitor 27 (ST920), and the process terminates. If no error occurs, the decrypted data is sent to the IFAX terminal 21B and is printed or displayed (ST921). Then, a transmission confirmation mail is created, and is transmitted to the mail server 9 according to SMTP protocol (SD922).

When the mail server 9 receives the transmission confirmation mail, the mail server 9 recognizes that the received mail is the transmission confirmation mail, in ST808 in FIG. 9, and transmits the transmission confirmation mail to the sender according to the SMTP protocol (ST813). The transmission confirmation mail is, as shown in the sequential chart shown in FIG. 6, received by the sender side IFAX terminal 21A through the reception side secure IFAX adapter 23B, the mail server 9 and the sender side secure IFAX adapter 23A according to the SMTP protocol, and is displayed or printed as a transmission report. Further, when the transmission confirmation mail arrives, the sender side secure IFAX adapter 23A stores the arrival of the transmission confirmation mail into the history management server 7.

As described above, according to the embodiment of the present invention, when the mail server 9 receives a mail with signature (in other words, an electronic mail to which the signature process and encryption are applied), the receiver of the mail withy signature transmits a reception notification mail to the reception side secure IFAX adapter 23B in which the receiver of the mail with signature is registered. When the reception side secure IFAX adapter 23B receives the reception notification mail, the reception side secure IFAX adapter 23B notifies the reception (arrival) of an encrypted mail to the receiver, who is the owner of the destination account of the encrypted mail, requests personal authentication of the receiver by using the IC card 109, and receives and decrypts the mail with signature after the receiver is confirmed (authenticated). Accordingly, it is possible to enable a desired receiver to retrieve a confidential document of the mail with signature from the mail server 9 immediately and securely. As a result, both the high level confidentiality and immediate (urgent) transmission of the confidential document, which are contradictory requests, can be achieved at the same time.

Moreover, the sender side secure IFAX adapter 23A performs personal authentication by querying the certificate server 10 the validity of a certificate by using IC card 109, and, after the sender is confirmed, the electronic mail is processed by the signature process and is encrypted before transmission to a destination. Accordingly, a confidential document can be prevented from being transmitted by an unauthorized sender.

Further, when the reception side secure IFAX adapter 23B receives the mail with signature normally, a transmission confirmation notification is sent back to the sender side. The sender side IFAX terminal 21A prints the transmission confirmation notification, or stores a transmission history into the history management server 7. Accordingly, it is possible for the sender to confirm transmission of the confidential document, or, a third person to easily confirm transmission history later.

In the above-described embodiment, the basic construction of the IFAX (construction to transmit/receive image information by electronic mail, etc.) and the expanded construction of the secure IFAX (a signature process and an encryption process, etc.) are respectively implemented by separate devices. However, the implementation is not limited thereto, rather, the IFAX terminal 21 can include the functions of the secure IFAX adapter 23.

Further, in the above-described embodiment, to perform personal authentication, a certificate stored in the IC card 109 is confirmed (authenticated) by the certificate server 10.

However, alternatively, other commonly known personal authentication techniques, such as voice authentication, fingerprint authentication, and so on, can be used. Moreover, these commonly known personal authentication techniques can be used with the authentication using the IC card. However, the personal authentication using the IC card, which is used in the above-described embodiment, is superior because the encryption using the public key and the decryption using the confidential key are enabled.

Further, in the above-described embodiment, a signature process and an encryption process are applied to the electronic mail. However, it is possible to encrypt the electronic mail without the signature process. Thus, the present invention is broadly related to transmission of an encrypted electronic mail, in other words, transmission of a confidential document by an encrypted mail.

This invention is, as clearly understood by a person skilled in the art, implemented by a commonly distributed (circulated) digital computer and a microprocessor programmed according to the technique described in the above-described embodiment. Further, as clearly understood by a person skilled in the art, this invention includes a computer program created by a person skilled in the art in accordance with the technique described in the above-described embodiment.

Moreover, a computer program product, which is a recording medium including commands that can be used to program a computer that implements (embodies) the present invention, is included in the scope of the present invention. This recorded medium can be a floppy disk, an optical disk, a CD-ROM, a disk, such as a magnetic disk, ROM, RAM, EPROM, EEPROM, a magnetic optical card, a memory card or a DVD, or the like. However, the recording medium is not limited thereto.

As explained above, according to the present invention, when the electronic mail server device receives an encrypted mail, the electronic mail server device sends a reception notification mail notifying the reception of the electronic mail to the reception side electronic mail reception terminal device in which the receiver of the encrypted mail is registered. When electronic mail reception terminal device receives the reception notification mail, the electronic mail reception terminal device informs the reception of the encrypted mail to the receiver, who is the owner of the encrypted mail identified by the destination account of the encrypted mail, requests for personal authentication of the receiver, and receives and decrypts the encrypted mail after the receiver is confirmed (authenticated). Accordingly, a desired receiver is enabled to retrieve a confidential document of the encrypted mail from the electronic mail server device immediately and securely.

The present disclosure relates to subject matter contained in priority Japanese Application No. 2001-56607, filed on Mar. 1, 2001, which is herein expressly incorporated by reference in its entirety.

What is claimed is:

1. An encrypted mail transmission system, comprising:
   an e-mail transmission device configured to generate an e-mail with a digital signature by encrypting an e-mail directed to an e-mail reception device, and to transmit the e-mail with the digital signature;
   an e-mail server device configured to:
      receive, from the e-mail transmission device, an e-mail directed to the e-mail reception device;
      determine whether the received e-mail is the e-mail with the digital signature;
      transmit to the e-mail reception device a notification indicating that the received e-mail is stored in the e-mail server device, when it is determined that the received e-mail is the e-mail with the digital signature, the notification including information specific to a destination of the received e-mail, the notification being distinct from the received e-mail, and
      transmit to the e-mail reception device the received e-mail without the digital signature, when it is determined that the received e-mail is not the e-mail with the digital signature; and
   an e-mail reception device, comprising:
      an input device configured to input information specific to a user of the e-mail reception device; and
      a controller configured to:
         receive, from the e-mail server device, the notification;
         determine whether the information specific to the destination of the received e-mail included in the received notification is consistent with the information specific to the user of the e-mail reception device input by the input device;
         retrieve, from the e-mail server device, the received e-mail with the digital signature when the notification is received and when it is determined that the information specific to the destination of the received e-mail is consistent with the information specific to the user of the e-mail reception device, and
         decrypt the received e-mail with the digital signature.

2. The encrypted mail transmission system according to claim 1,
   wherein the input device comprises a memory slot and a memory card, the memory slot receiving the memory card, the memory card storing the information specific to the user of the e-mail reception device, the information specific to the user of the e-mail reception device being input into the e-mail reception device in association with installing the memory card into the memory slot.

3. The encrypted mail transmission system according to claim 2,
   wherein the received e-mail with the digital signature is encrypted using confidential key information of the e-mail transmission device, the memory card stores confidential key information of the e-mail reception device, and the controller decrypts the received e-mail with the digital signature using the confidential key information of the e-mail reception device stored in the memory card.

4. The encrypted mail transmission system according to claim 2, further comprising:
   a certification server configured to determine a validity of a certification, wherein the memory card stores a certificate of the user of the e-mail reception device, the controller queries the certification server regarding a validity of the certification when it is determined that the information specific to the destination of the received e-mail is consistent with the information specific to the user of the e-mail reception device, and the controller retrieves, from the e-mail server device, the received e-mail with the digital signature when it is determined that the certification is valid.

5. The encrypted mail transmission system according to claim 1, further comprising:

a certificate server configured to authenticate a user of the e-mail transmission device, wherein the e-mail transmission device encrypts the e-mail directed to the e-mail reception device, after the certificate server authenticates the user of the e-mail transmission device.

6. The encrypted mail transmission system according to claim 5,
wherein the e-mail transmission device comprises a memory slot, a memory card being installed into the memory slot, the memory card storing a certification of a user of the e-mail transmission device, the e-mail transmission device queries the certification server regarding a validity of the certification stored in the memory card, and the e-mail transmission device determines that the user of the e-mail transmission device is authenticated when the certificate server determines that the certification is valid.

7. The encrypted mail transmission system according to claim 1, further comprising:
a certificate server configured to store public key information, wherein the e-mail transmission device receives the public key information from the certificate server and encrypts the e-mail directed to the e-mail reception device using the received public key information, and the e-mail reception device decrypts the received e-mail with the digital signature using the public key information.

8. The encrypted mail transmission system according to claim 6,
wherein the e-mail transmission device determines that the user of the e-mail transmission device is an authorized user when the certificate server authenticates the user of the e-mail transmission device.

9. The encrypted mail transmission system according to claim 1,
wherein the e-mail reception device transmits, to the e-mail transmission device, a reception notification indicating that the e-mail reception device has received the received e-mail.

10. The encrypted mail transmission system according to claim 9,
wherein the e-mail transmission device comprises an output device configured to output the reception notification.

11. The encrypted mail transmission system according to claim 10,
wherein, when the e-mail transmission device receives a plurality of reception notifications, the output device outputs the plurality of the reception notifications.

12. The encrypted mail transmission system according to claim 1,
wherein the e-mail transmission device registers, into the e-mail server device, a history of transmission of the e-mail with the signatures.

13. The encrypted mail transmission system according to claim 1,
wherein the information specific to the destination of the received e-mail comprises a mail address of the destination.

* * * * *